United States Patent [19]

Sibata et al.

[11] Patent Number: 5,528,087
[45] Date of Patent: Jun. 18, 1996

[54] POWER SUPPLY APPARATUS FOR EFFICIENT POWER CONSERVATION OF A BATTERY

[75] Inventors: Yosimitu Sibata, Okazaki; Tadao Nojiri, Oobu, both of Japan

[73] Assignee: Nippondenso Co., Ltd., Kariya, Japan

[21] Appl. No.: 48,889

[22] Filed: Apr. 20, 1993

[30] Foreign Application Priority Data

Apr. 23, 1992 [JP] Japan ................................. 4-129994

[51] Int. Cl.⁶ .................................................. H02M 7/00
[52] U.S. Cl. .......................... 307/66; 323/224; 320/23
[58] Field of Search ............................ 307/64–66, 43–48, 307/72–76; 323/318, 349–351, 222–225, 268, 282–284, 259; 320/19–23, 48–50

[56] References Cited

U.S. PATENT DOCUMENTS

| | | | |
|---|---|---|---|
| 4,816,862 | 3/1988 | Taniguchi et al. | 354/412 |
| 4,845,419 | 7/1989 | Hacker | 320/39 |
| 5,021,679 | 6/1991 | Fairbanks et al. | 307/66 |
| 5,151,645 | 9/1992 | Murata | 320/23 |
| 5,304,916 | 4/1994 | Le et al. | 320/23 |

FOREIGN PATENT DOCUMENTS

61-192643  11/1986  Japan .

*Primary Examiner*—Peter S. Wong
*Assistant Examiner*—Adltya Krishnan
*Attorney, Agent, or Firm*—Cushman, Darby & Cushman

[57] ABSTRACT

A power supply apparatus suitable for a hand-held terminal or the like. In response to a power supply switch turning on, a voltage of a battery is supplied to a boosting voltage circuit and maintained through a diode at a charge capacitor and then applied to a memory, thereby allowing the hand-held terminal to operate normally. While the power supply switch is turned off, the supply voltage stored in the capacitor and applied to the memory is compared with a reference voltage in a comparator. When the supply voltage is lower than the reference voltage, the comparator outputs a signal to a control circuit couple the battery to the boosting circuit for a predetermined time so as to re-charge the capacitor and therefore guarantee back-up of the memory. This arrangement allows the use of the hand-held terminal for a longer time than is normally achieved concurrently with a normal operation of the hand-held device.

22 Claims, 7 Drawing Sheets

POWER SUPPLY APPARATUS FOR EFFICIENT POWER CONSERVATION OF A BATTERY

BACKGROUND OF THE INVENTION

The present invention relates to a power supply apparatus applicable to portable equipment.

Figure 7:
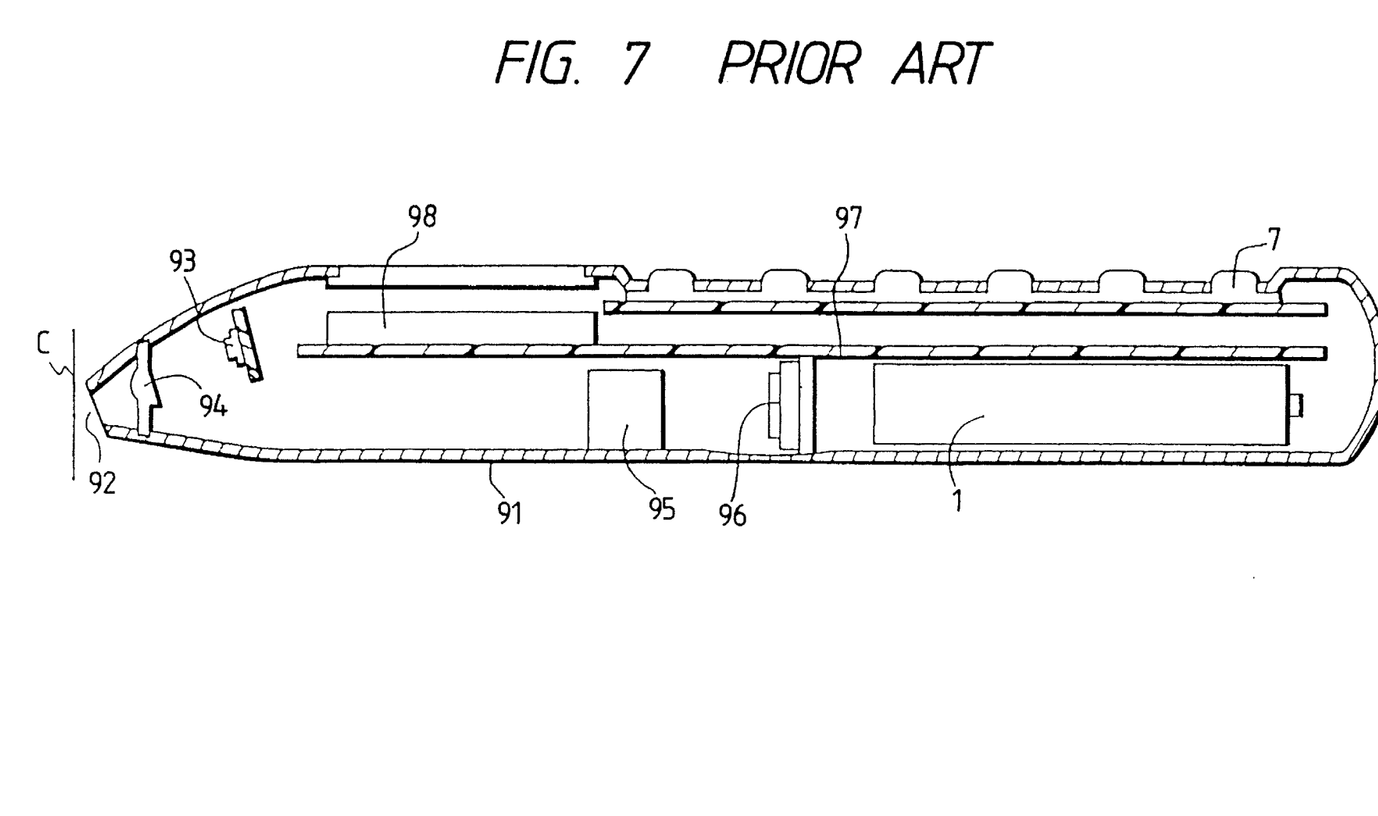
FIG. 7 is a cross-sectional view showing a conventional hand-held terminal.

Of the many types of portable equipment, a portable bar code reader (handy terminal) has attracted interest. The portable equipment such as the portable bar code reader encases devices such as a CPU the and a memory. This portable bar code reader, as illustrated in FIG. 7, comprises an evenly flat type casing 91 whose tip portion is used as a reading opening 92. Light emitted from a light-emitting diode 93 advances through a condensing lens, formed in a portion of a dust protective plate 94 at the vicinity of the aforementioned opening 92, to a bar code C. The light reflected on the bar code C is incident on an image sensor 96 through a lens 95 within the casing 91 so as to be processed by a CPU (not shown) provided on a printed circuit board 97. After processing by the CPU, necessary information is displayed on a display 98. A plurality of push-buttons are provided on the casing 91, and one of the plurality of push-buttons is used as a power switch 7. The operations of the respective circuits provided in the handy terminal are ensured by a power of a battery 1 disposed within a casing 91. Generally, a Ni—Cd cell is used as the battery 1. This is because an alkaline cell, which is the most commonly used cell, has a problem in that its output voltage gradually decreases from its rated voltage (1.5 V) with use so as to make it difficult to surely keep the voltage constant.

However, although keeping its rated voltage (1.2 V) relatively constant, the Ni—Cd cell has a disadvantage in that the output voltage rapidly decreases when reaching the end of its lifetime, which is generally shorter than that of the alkaline cell. In addition, a special charging device is required for quickly charging the Ni—Cd cell, thus making it difficult to easily use it.

SUMMARY OF THE INVENTION

It is therefore an object of the present invention to provide a power supply apparatus which is capable of using an alkaline cell, manganese cell or the like and adequately supplying a power concurrently with use of a handy terminal for a longer time than is usually associated with such cells.

This invention is based on the fact that, when not using the handy terminal, most of the current consumption occurs in a back-up of a RAM. However, the voltage necessary for the RAM back-up is as small as about 2 V (whereas the operating voltage of the the handy terminal is somewhat larger, such as about 4.8 V).

According to this invention, a power supply apparatus comprises boosting means for boosting a voltage from a battery to supply the boosted voltage to a memory and a back-up power source provided in parallel to the memory. A voltage to be supplied from the back-up power source to the memory is compared with a reference voltage in comparison means. Switching means provided between the battery and the boosting means is closed when a power supply switch is in a turned-on state, and closed for a predetermined time when the voltage from the back-up power source is lower than the reference voltage and the power supply switch is in a turned-off state.

Thus, when the power supply switch is turned on, the switching means couples the battery to the boosting means to cause the boosted voltage to be applied to the memory so that a hand-held terminal or the like effects normal operations such as a reading and writing operation. On the other hand, when the power supply switch is in the turned-off state, the switching means is intermittently turned on when the voltage from the back-up power source to the memory is lower than the reference voltage, whereby the back-up power source is charged up to the boosted voltage so as to ensure the back-up of the memory. The switching means is again turned-off after charging the back-up power source.

This arrangement allows the use of the hand-held terminal or the like for a relatively long time concurrently with a normal operation of the hand-held terminal or the like irrespective of the use of an easy cell such as alkaline or manganese as the battery.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
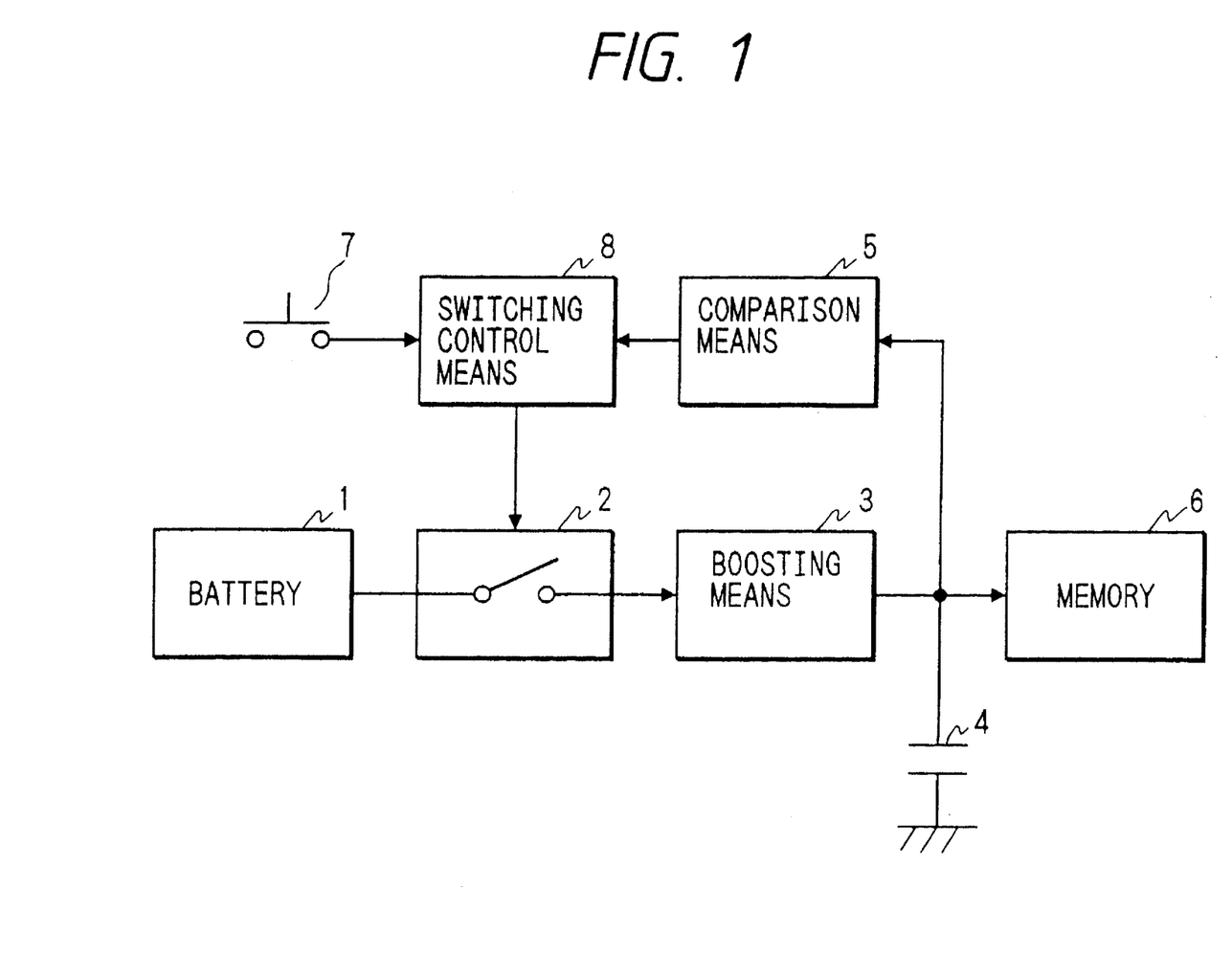
FIG. 1 is a block diagram showing a basic arrangement of a power supply apparatus according to this invention.

FIG. 1 is a block diagram showing a basic arrangement of a power supply apparatus according to this invention. In FIG. 1, designated at numeral 3 is a boosting means 3 coupled through a switching means 2 to a battery 1 to boost the voltage of the battery 1 and then apply it to a memory 6. The switching means 2 is operated by a switching control means 8. When turning ON a power switch 7, the switching control means 8 operates the switching means 2 to cause the boosting means 3 to be coupled to the battery 1. Further, the switching control means 8 is coupled to a comparison means 5 which is in turn coupled to the boosting means 3 and a capacitor 4 disposed in parallel to the memory 6. The comparison means 5 detects the supply voltage to the memory to generate an output signal when the supply voltage thereto is lower than a reference voltage. The switching control means 8 operates the switching means 2 in accordance with the output signal of the comparison means 5 to cause the battery 1 to be coupled to the boosting means 3 for a predetermined time period when the power switch 7 is in the OFF state.

Figure 2:
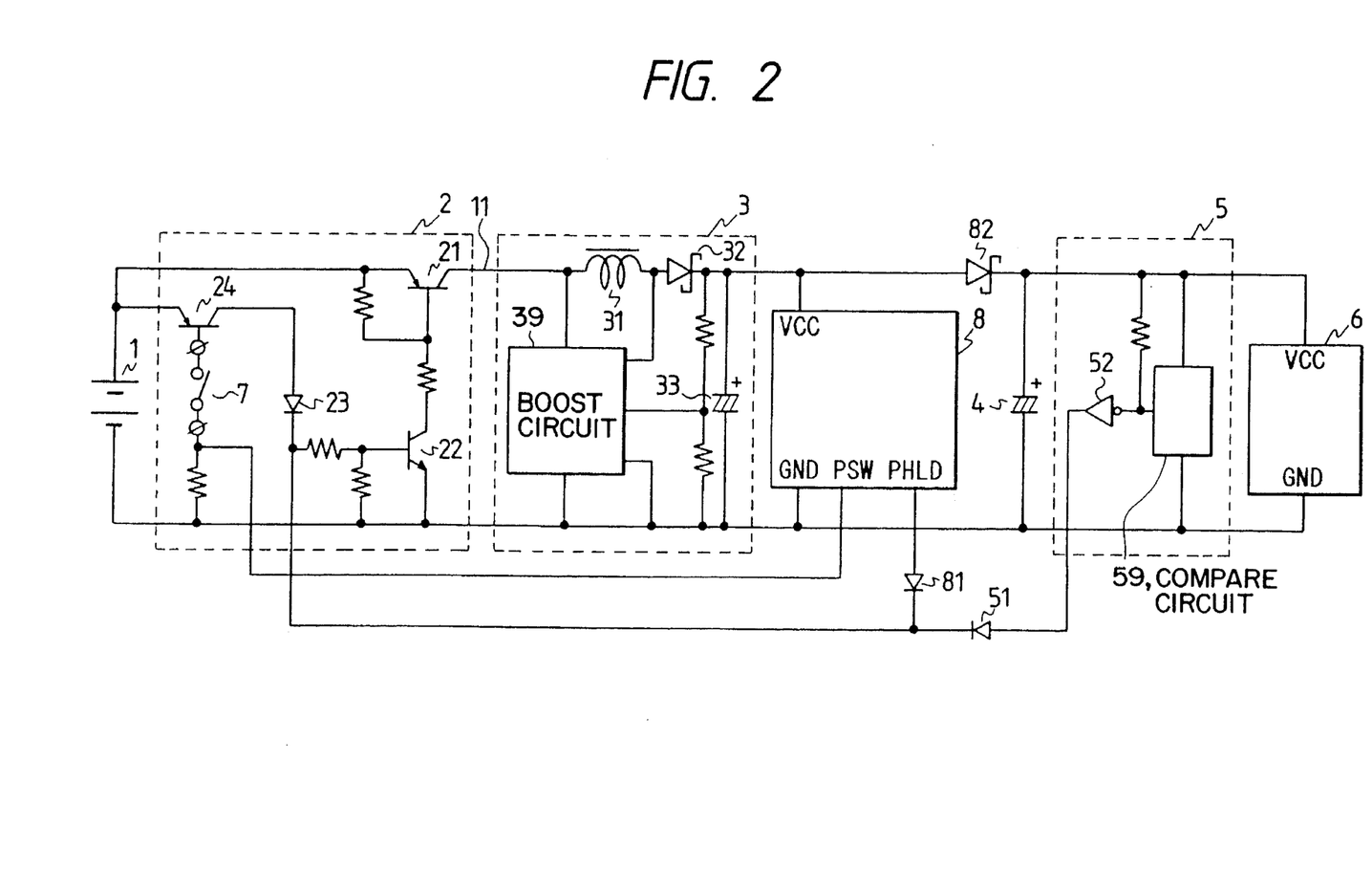
FIG. 2 is a circuit diagram showing an arrangement of a power supply apparatus according to a first embodiment of this invention.

FIG. 2 is a circuit diagram showing a detailed arrangement of a power supply apparatus according to a first embodiment of this invention. The apparatus, together with a CPU, being provided on a printed circuit board of a hand-held terminal (see FIG. 7). In FIG. 2, a switching circuit (switching means) 2 couples the battery 1 to a boosting circuit (boosting means) 3 and comprises a main transistor 21 connected to an electric wire 11 advancing toward a RAM 6. The energization (activation) of the main transistor 21 is controlled by an auxiliary transistor 22 which is connected to the base side of the main transistor 21. The auxiliary transistor 22 is coupled through a diode 23 to another auxiliary transistor 24 which is in turn connected to the battery 1. To the base side of the auxiliary transistor 24 there is coupled a momentary type power supply switch 7 (see also FIG. 7). Here, the battery 1 comprises two alkaline cells (rated voltage of each being 1.5 V) connected in series to each other thereby forming a 3 volt rated power source.

Figure 3:
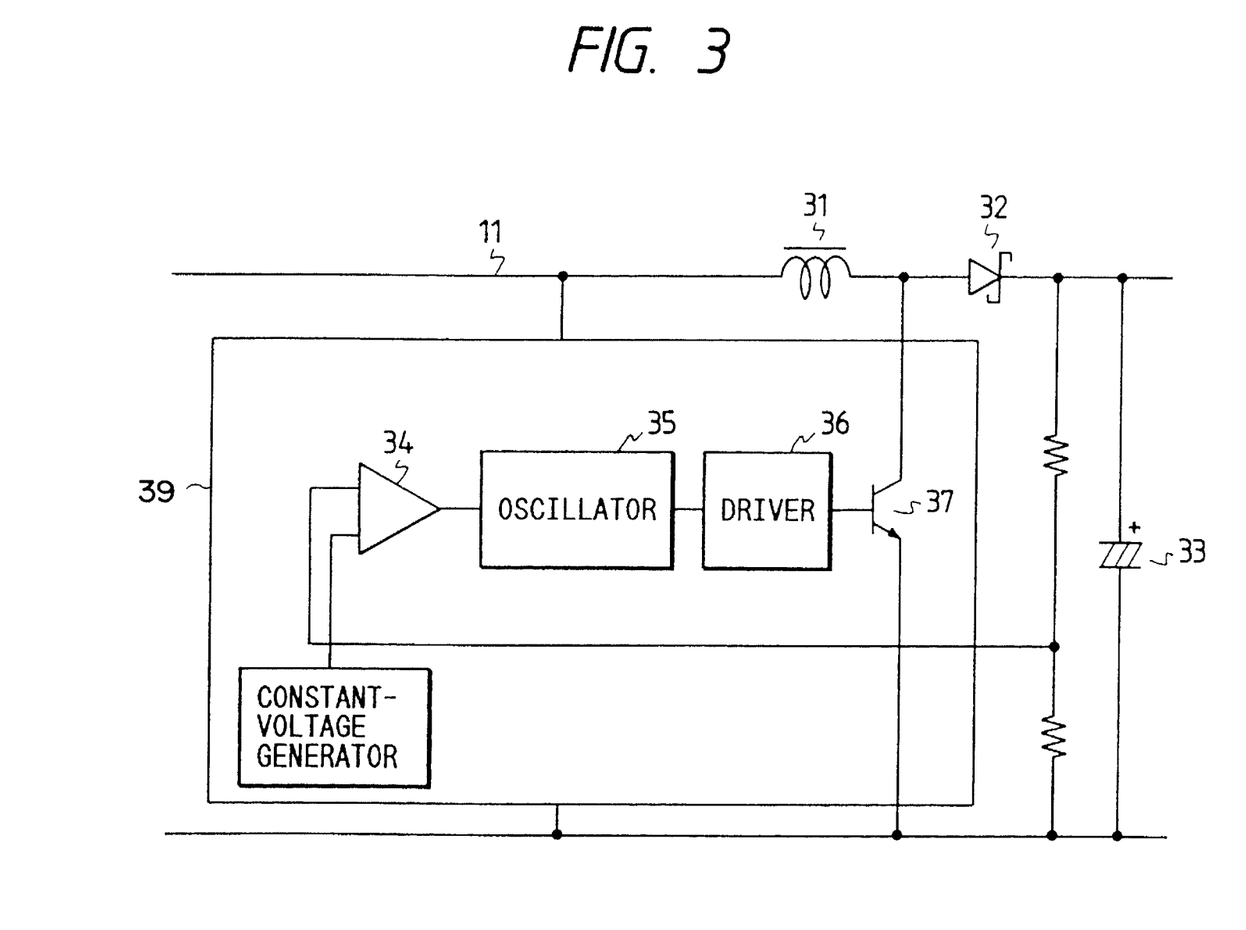
FIG. 3 is a circuit diagram showing an arrangement of a boosting circuit which can be used in the apparatus shown in FIG. 2.

The boosting circuit 3 comprises a reactor 31, a boost circuit 39, and a rectifier diode 32 which are connected to the above-mentioned electric wire 11. As shown in FIG. 3, the secondary side voltage of the rectifier diode 32 smoothed by an auxiliary capacitor 33 is fed back to a comparator 34, after being resistively potential-divided, so as to be compared with a constant voltage from a constant-voltage generator. When the divided voltage is lower than the constant voltage, the comparator 34 generates an output whereby an oscillator 35 operates so as to ON-OFF-drive a power transistor 37 through a driver 36. When the transistor 37 is in the OFF state, a high voltage is output from the secondary side of the reactor 31 and then smoothed by the auxiliary capacitor 33 to produce a predetermined high direct-current voltage (4.8 V). If the input voltage at wire 11 is in a range of 1.8 to 3.6 V, this boosting circuit 3 accurately outputs the boosted voltage of 4.8 V.

Returning to FIG. 2, the boosted voltage is input to a power supply terminal Vcc of a CPU 8 which also acts as the switching control means. To a PSW terminal of the CPU 8 there is input a secondary side voltage of the power supply switch 7. The operating state of the power supply switch 7 is detectable by this input voltage. The output of a PHLD terminal of the CPU 8 is coupled to the base of the auxiliary transistor 22 of the switching circuit 2. Further, the boosted voltage is supplied through a diode 82 to a main capacitor 4 connected in parallel to a memory 6. The terminal voltage (i.e., the supply voltage to the memory 6) of the capacitor 4 is detected by a comparator (comparison means) 5. The comparator 5 includes a compare circuit 59 and compares the aforementioned terminal voltage with a reference voltage (for example, 2.2 V). When the boosted voltage is lower than the reference voltage, the comparator 5 generates an output signal with a high or "H" level from a gate 52. This output signal is input through a diode 51 to the base of the auxiliary transistor 22 of the switching circuit 2.

The operation of the power supply apparatus thus arranged will be described hereinbelow with reference to FIGS. 4 and 5. The hand-held terminal is started in response to a press of the power supply switch 7. The auxiliary transistors 24 and 22 then energize whereby the main transistor 21 is energized to cause the battery voltage to be applied to the boosting circuit 3. The boosted voltage is supplied to the CPU 8 and the memory 6 in addition to charging the main capacitor 4. Thus, the CPU 8 starts by detecting the signal level of the power supply switch 7 when pressed at the PSW terminal (step 101 in FIG. 4) and, because of the high "H" level, performs a step 102 to set the PHLD terminal output to the high "H" level. At this time, even after the power supply switch 7 is released, the auxiliary transistor 22 is maintained in an energized state. In this energized state, the CPU 8 performs normal processing operations using the memory 6 in response to a reading of the bar code (step 103). To turn off the hand-held terminal, the power supply switch 7 is again pressed. Because the PSW terminal is again signaled at a high "H" level (step 104), the CPU 8 sets the PHLD terminal output to the "L" level (step 105). In response to releasing the power supply switch 7, the auxiliary transistor 22 and the main transistor 21 assume non-energizing states and the operation of the CPU 8 stops. This timing is indicated by A in FIG. 5. Since the supply of the battery voltage stops, the memory voltage (the boosted voltage of the main capacitor 4) gradually decreases from 4.8 V. When the memory voltage becomes lower than 2.2 V which is slightly higher than the back-up guarantee voltage 2 V of such memory devices (B in FIG. 5), the comparator 5 generates the output signal with the "H" level whereby the auxiliary transistor 22 and the main transistor 21 take the energizing states so that the supply of the boosted voltage again causes to cause the CPU 8 to operate.

Figure 4:
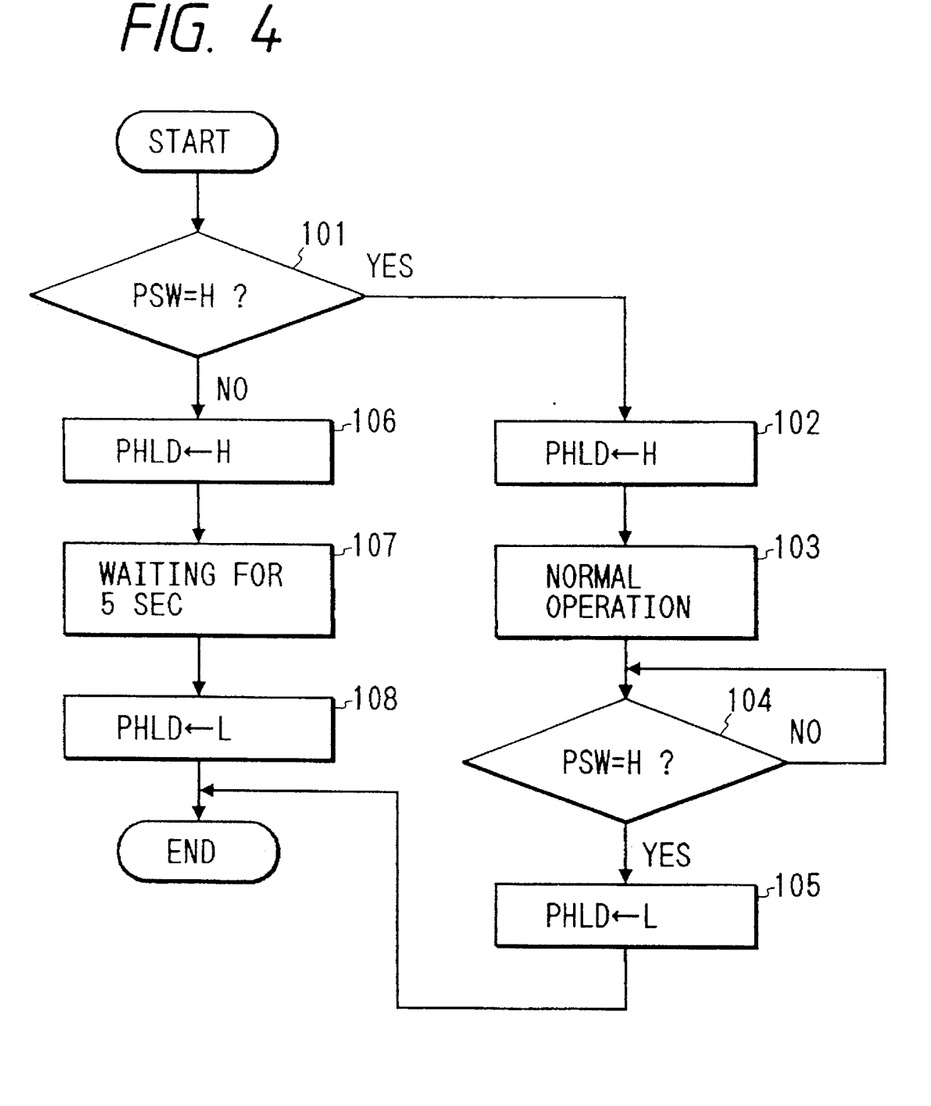
FIG. 4 is a flow chart showing an operation of a CPU to be effected in the apparatus shown in FIG. 2.
Figure 5:
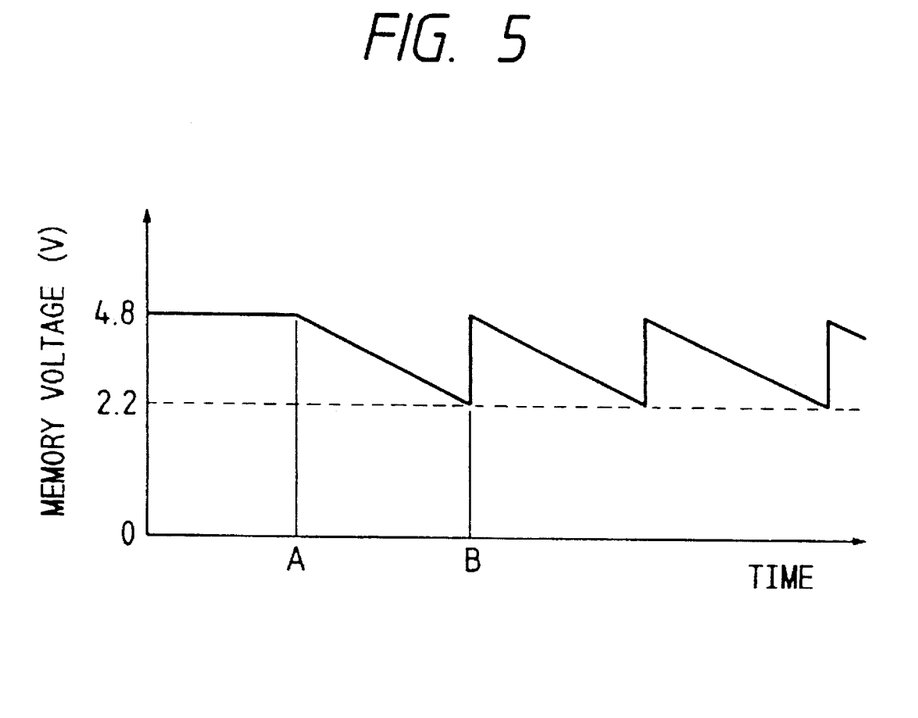
FIG. 5 is a graphic illustration for describing the variation of a memory voltage in the apparatus shown in FIG. 1.

Since the signal level of the PSW terminal is at a low "L" level, the operation advances from the step 101 to a step 106 in FIG. 4 so as to set the PHLD terminal output to the high "H" level to supply the battery voltage for 5 seconds (steps 107 and 108). Accordingly, the memory voltage again increases up to 4.8 V. Thereafter, whenever the memory voltage becomes lower than 2.2 V, the battery voltage is supplied to start the CPU 8 and raise the memory supply voltage.

Thus, even while the voltage of the battery 1 using alkaline cells gradually decreases over time and use from 3 V to 1.8 V, an adequate operating voltage is still supplied from the boosting circuit 3 to the CPU 8 and the memory 6, and the discharge of the battery 1 is only intermittently effected at the time of the back-up and therefore minimizes the consumption thereof. This allows for a long-time use of the hand-held terminal irrespective of the use of easy cells such as alkaline or manganese.

Figure 6:
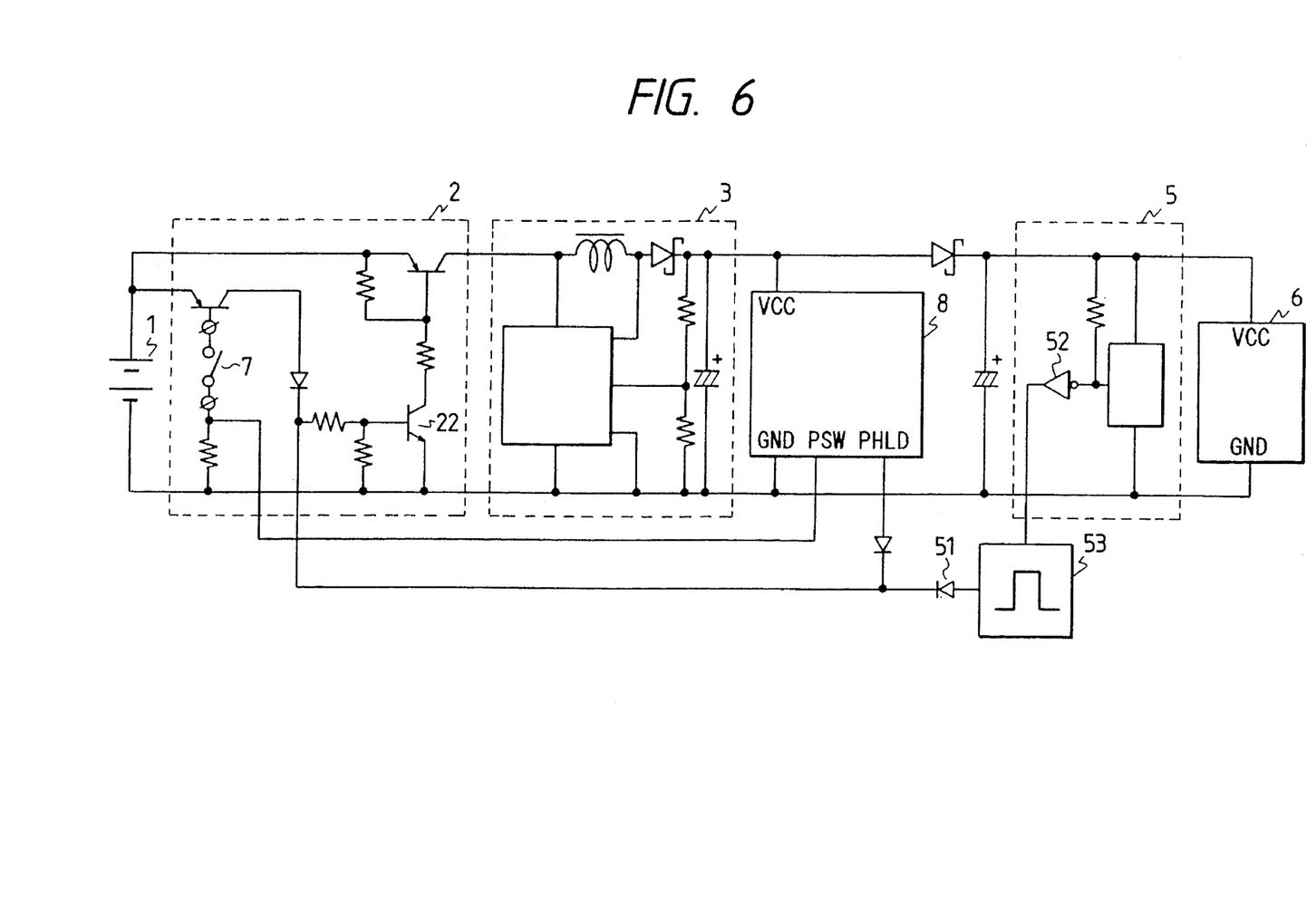
FIG. 6 is a circuit diagram showing an arrangement of a power supply apparatus according to a second embodiment of this invention.

A description will be made hereinbelow in terms of a second embodiment of this invention. According to the above-described first embodiment, if the cells of the battery 1 are taken out for exchange at the time that the memory voltage decreases to within the vicinity of around 2.2 V, the output signal of the comparator 5 maintains a high "H" level as it is, whereby there is the possibility that the discharge will occur rapidly in the main capacitor 4 and hence the voltage will become lower than the back-up guarantee voltage (2 V). The second embodiment eliminates this problem and is arranged such that a one-shot circuit 53 is provided in the passage from the comparator 5 to the auxiliary transistor 22 and at the output side of the gate 52 as shown in FIG. 6. The output signal with a relatively large current value to operate the auxiliary transistor 22 is generated only for a predetermined time (for example 1 second) and hence the discharge of the capacitor 4 is prevented so as to maintain the back-up guarantee voltage.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in the above-described embodiment the momentary type switch is used as the power supply switch 7, it is also appropriate to use an alternate type switch therefor.

What is claimed is:

1. A power supply apparatus comprising:

a battery;

boosting means for boosting a power voltage from said battery to a boosted voltage which is higher than said power voltage and for supplying said boosted voltage to a memory;

a back-up power source connected to said boosting means and charged by said boosted voltage, and provided in parallel to said memory for supplying a back-up voltage to said memory;

comparison means for comparing said back-up voltage with a reference voltage, said comparison means generating an output signal when said back-up voltage is lower than said reference voltage;

switching means provided between said battery and said boosting means for coupling and uncoupling said battery with said boosting means;

a power supply switch for indicating a power ON condition and a power OFF condition; and switching control means, responsive to said comparison means and said power supply switch and controlling said switching means, for activating said switching means to couple said battery with said boosting means when said power supply switch indicates said power ON condition, and for activating said switching means to intermittently couple said battery with said boosting means for only a predetermined period of time in accordance with said output signal of said comparison means after said power supply switch indicates said power OFF condition.

2. An apparatus as claimed in claim 1, further comprising:

drive means provided between said comparison means and said switching control means for driving said switching means with said output signal from said comparison means; and wherein said back-up power source continues to supply power to said memory even after said drive means stops driving said switching means at a time of exchange of said battery.

3. An apparatus as claimed in claim 2, wherein said battery comprises a battery cell.

4. A power supply apparatus according to claim 1, wherein said reference voltage is substantially lower than said boosted voltage.

5. A power supply apparatus comprising:

a power source;

storage means for storing information;

boosting means for boosting a power voltage from said power source to a boosted voltage which is higher than said power voltage;

a back-up power source for providing a back-up voltage to maintain said information stored in said storage means, said back-up power source being connected to said boosting means and charged by said boosted voltage; and control means for detecting a level of said back-up voltage and for intermittently re-charging said back-up power source to said boosted voltage when said detected level of said back-up voltage is lower than a predetermined voltage.

6. An apparatus as claimed in claim 4, wherein said control means includes:

switching means provided between said power source and said boosting means for coupling and uncoupling said power source with said boosting means; and change-over means for activating said switching means to couple said power source with said boosting means during accessing of said storage means and for activating said switching means to intermittently couple said power source with said boosting means for only a predetermined amount of time after said detected level of said back-up voltage is lower than said predetermined voltage when said storage means is not being accessed.

7. An apparatus as claimed in claim 6, further comprising:

drive means connected to said change-over means for driving said switching means; and wherein said back-up power source continues to supply power to said storage means even after said drive means stops driving said switching means at a time of exchange of said power source.

8. An apparatus as claimed in claim 7, wherein said power source comprises a battery cell.

9. A power supply apparatus according to claim 5, wherein said predetermined voltage is substantially lower than said boosted voltage.

10. A power supply apparatus comprising:

a battery;

a power supply switch for indicating a power ON condition and a power OFF condition;

switching means coupled to said battery;

boosting means coupled through said switching means to said battery for boosting a power voltage from said battery to a boosted voltage in response to said power ON condition indicated by said power supply switch, said boosted voltage being supplied to a memory;

capacitor means coupled to said boosting means and coupled in parallel to said memory, for supplying a back-up voltage to said memory when said power supply switch indicates a power OFF condition;

comparison means for detecting a level of said back-up voltage of said capacitor means when said power supply switch indicates a power OFF condition, said comparison means generating an output signal when said detected level of said back-up voltage is lower than a reference voltage; and switching control means for activating said switching means to intermittently couple said battery with said boosting means for only a predetermined amount of time in response to said output signal of said comparison means so that said boosting means intermittently boosts said power voltage from said battery to said boosted voltage to intermittently charge said capacitor means from said back-up voltage to said boosted voltage.

11. An apparatus as claimed in claim 10, further comprising:

drive means provided between said comparison means and said switching control means for driving said switching means with said output signal from said comparison means; and wherein said capacitor means continues to supply power to said memory even after said drive means stops driving said switching means at a time of exchange of said battery.

12. An apparatus as claimed in claim 11, wherein said battery comprises a battery cell.

13. A power supply apparatus according to claim 10, wherein said reference voltage is substantially lower than said boosted voltage.

14. A power supply apparatus comprising:

a battery;

data storage means for storing information;

boosting means for boosting a power voltage from said battery to a boosted voltage which is higher than said power voltage;

switching means provided between said battery and said boosting means, said switching means having a first state where said power voltage from said battery is applied to said boosting means and said boosted voltage is applied to said data storage means, and said switching means having a second state where said power voltage from said battery is intermittently prevented from being applied to said boosting means;

capacitor means coupled to an output of said boosting means so as to be charged to said boosted voltage when said switching means is in said first state, said charged voltage of said capacitor means being applied to said data storage means when said switching means is in said second state;

comparison means for monitoring said charged voltage applied to said data storage means and for producing a signal when said monitored voltage is lower than a reference voltage; and switching control means for controlling said switching means from said first state to said second state, said second state of said switching control means allowing said capacitor means to apply said charged voltage to said data storage means when said comparison means produces said signal.

15. An apparatus as claimed in claim 14, wherein said switching control means cycles between holding said first state of said switching means for only a predetermined amount of time in response to said output signal produced by said comparison means, and holding said second state of said switching means when said output signal is not produced by said comparison means.

16. A power supply apparatus according to claim 14, wherein said reference voltage is substantially lower than said boosted voltage.

17. A hand-held apparatus having an operation mode and a stand-by mode, said apparatus comprising:

a power supply switch manually operable for selecting one of said operation mode and said stand-by mode of said apparatus;

a battery;

boosting means for boosting a power voltage from said battery;

switching means provided between said battery and said boosting means, said switching means having a first state wherein said power voltage from said battery is applied to said boosting means so as to be boosted to a boosted voltage, and having a second state wherein said power voltage from said battery is prevented from being applied to said boosting means;

capacitor means coupled to an output of said boosting means so as to be charged to said boosted voltage when said switching means is in said first state, said capacitor means having storage means for storing information, said storage means being powered by said boosted voltage from said boosting means when said switching means is in said first state, and said storage means being backed-up with said charged voltage from said capacitor means when said switching means is in said second state;

comparison means for monitoring said charged voltage backing-up said storage means, and for producing an output signal when said monitored charged voltage is lower than a reference value; and switching control means for setting said switching means to said first state when said apparatus is in said operation mode, and for causing said switching means to alternate between said first state and said second state in said stand-by mode so as to allow said capacitor means to be intermittently charged to said boosted voltage from said boosting means when said comparison means produces said output signal.

18. An apparatus as claimed in claim 17, wherein said switching control means intermittently holds said first state of said switching means for only a predetermined amount of time when said apparatus is in said stand-by mode.

19. A hand-held apparatus having an operation mode and a stand-by mode according to claim 13, wherein said reference value is substantially lower than said boosted voltage.

20. A power supply apparatus comprising:

a power source;

boosting means for boosting a voltage from said power source to a boosted voltage which is higher than said voltage from said power source;

a back-up power source connected to an output of said boosting means for supplying a back-up voltage to back-up said power source;

comparison means for comparing said back-up voltage with a reference voltage, said comparison means generating an output signal when said back-up voltage is lower than said reference voltage;

switching means for selectively providing said boosted voltage to said back-up power source;

power indicating means for indicating a power ON condition and a power OFF condition; and switching control means for activating said switching means to apply said boosted voltage to said back-up power source when said power indicating means indicates said power ON condition, and for activating said switching means to intermittently apply said boosted voltage to said back-up power source for only a predetermined period of time in accordance with said output signal of said comparison means after said power indicating means indicates said power OFF condition.

21. A power supply apparatus as claimed in claim 20, further comprising:

data storage means for storing information, said data storage means being powered at said boosted voltage during said power ON condition and being powered at least at said reference voltage by said back-up power source means during said power OFF condition;

said back-up power source being occasionally but not continuously recharged to said boosted voltage.

22. A power supply apparatus according to claim 20, wherein said reference voltage is substantially lower than said boosted voltage.

* * * * *